United States Patent
Naser et al.

(10) Patent No.: US 12,267,529 B2
(45) Date of Patent: Apr. 1, 2025

(54) TRANSFORM SELECTION FOR IMPLICIT MULTIPLE TRANSFORM SELECTION

(71) Applicant: InterDigital VC Holdings, Inc., Wilmington, DE (US)

(72) Inventors: Karam Naser, Mouzé (FR); Fabrice LeLeannec, Betton (FR); Tangi Poirier, Thorigné-Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 103 days.

(21) Appl. No.: 17/615,499

(22) PCT Filed: May 28, 2020

(86) PCT No.: PCT/US2020/034859
§ 371 (c)(1),
(2) Date: Nov. 30, 2021

(87) PCT Pub. No.: WO2020/243258
PCT Pub. Date: Dec. 3, 2020

(65) Prior Publication Data
US 2022/0312040 A1  Sep. 29, 2022

(30) Foreign Application Priority Data

May 31, 2019 (EP) .................................... 19305698
Jun. 21, 2019 (EP) .................................... 19290045

(51) Int. Cl.
*H04N 19/70* (2014.01)
*H04N 19/103* (2014.01)
(Continued)

(52) U.S. Cl.
CPC ........... *H04N 19/70* (2014.11); *H04N 19/103* (2014.11); *H04N 19/176* (2014.11); *H04N 19/46* (2014.11)

(58) Field of Classification Search
CPC .... H04N 19/70; H04N 19/103; H04N 19/176; H04N 19/46; H04N 19/12; H04N 19/463; H04N 19/184; H04N 19/60
See application file for complete search history.

(56) References Cited

U.S. PATENT DOCUMENTS

| 8,031,969 B1 | 4/2011 | Kiel et al. |
| 2013/0003838 A1 | 1/2013 | Gao et al. |

(Continued)

FOREIGN PATENT DOCUMENTS

| CN | 105765979 A | 7/2016 |
| CN | 105915913 A | 8/2016 |

(Continued)

OTHER PUBLICATIONS

Garrido, M. J., et al., "A 2-D Multiple Transform Processor for the Versatile Video Coding Standard", IEEE, 2018, 10 pages.

(Continued)

*Primary Examiner* — Farzana Hossain
(74) *Attorney, Agent, or Firm* — Condo Roccia Koptiw LLP

(57) ABSTRACT

A method and apparatus to improve compression efficiency in a video compression scheme enables use of new tools with multiple transform selection. In one embodiment, transform pair selection is based on a flag indicative of low-frequency non-separable transforms. In another embodiment, transform pair selection is based on a flag indicative of low-frequency non-separable transforms and on a flag indicative of matrix-based intra prediction. In another embodiment, when an implicit multiple transform selection mode is used, transform pair selection is based on a flag indicative of low-frequency non-separable transforms. Bitstream syntax is used to convey the flags.

16 Claims, 10 Drawing Sheets

(51) Int. Cl.
*H04N 19/176* (2014.01)
*H04N 19/46* (2014.01)

(56) References Cited

U.S. PATENT DOCUMENTS

| | | |
|---|---|---|
| 2013/0034157 A1 | 2/2013 | Helle et al. |
| 2015/0110180 A1 | 4/2015 | An et al. |
| 2016/0212436 A1 | 7/2016 | Thorsten et al. |
| 2017/0094313 A1 | 3/2017 | Zhao et al. |
| 2018/0020218 A1 | 1/2018 | Zhao et al. |
| 2018/0077417 A1 | 3/2018 | Huang |
| 2020/0014924 A1* | 1/2020 | Zhao ............... H04N 19/46 |
| 2020/0177921 A1 | 6/2020 | Koo |
| 2021/0385499 A1* | 12/2021 | Zhang ............... H04N 19/70 |
| 2022/0038706 A1* | 2/2022 | Zhang ............... H04N 19/593 |
| 2022/0038744 A1* | 2/2022 | Nam ............... H04N 19/593 |
| 2022/0046240 A1* | 2/2022 | Chiang ............... H04N 19/70 |
| 2022/0060751 A1* | 2/2022 | Nam ............... H04N 19/18 |
| 2022/0295061 A1* | 9/2022 | Zhang ............... H04N 19/61 |
| 2024/0080442 A1* | 3/2024 | Zhang ............... H04N 19/11 |

FOREIGN PATENT DOCUMENTS

| | | |
|---|---|---|
| CN | 108141596 A | 6/2018 |
| CN | 109691101 A | 4/2019 |
| GB | 2568478 A | 5/2019 |
| WO | 2019/027302 A1 | 2/2019 |
| WO | 2019098464 A1 | 5/2019 |

OTHER PUBLICATIONS

Le Leannec, F., et al., "Non-CE6 : interaction between MTS and LFNST", Document: JVET-O0466, Joint Video Experts Team (JVET) of ITU-T SG 16 WP 3 and ISO/IEC JTC 1/SC 29/WG 11, 15th Meeting: Gothenburg, SE, Jul. 3-12, 2019, 9 pages.

Chen et al., "Algorithm description for Versatile Video Coding and Test Model 5 (VTM 5)", Joint Video Experts Team (JVET) of ITU-T SG 16 WP 3 and ISO/IEC JTC 1/SC 29/WG 11; Document: JVET-N1002-v1, 14th Meeting: Geneva, Switzerland, Mar. 19, 2019, 70 pages.

Egilmez, H., et al., "Non-CE6: A Simplification of Implicit MTS", Joint Video Experts Team (JVET) of ITU-T SG 16 WP 3 and ISO/IEC JTC 1/SC 29/WG 11; Document: JVET-N0419-v2, 14th Meeting: Geneva, CH, Mar. 19-27, 2019, 4 pages.

Bross et al., "Versatile Video Coding (Draft 5)", Joint Video Experts Team (JVET) of ITU-T SG 16 WP 3 and ISO/IEC JTC 1/SC 29/WG 11, Document: JVET-N1001-v9, 14th Meeting: Geneva, Switzerland, Mar. 19, 2019, 405 pages.

Iwamura, S., et al., "CE6-related: Implicit transform selection for Multi-hypothesis inter-intra mode", Joint Video Experts Team (JVET) of ITU-T SG 16 WP 3 and ISO/IEC JTC 1/SC 29/WG 11, Document: JVET-M0482-v3, 13 Meeting: Marrakech, MA, Jan. 9-18, 2019, 3 pages.

Naser, K., et al., "Non-CE6: Shape Adaptive Transform Selection for ISP, SBT and MTS", Joint Video Expert Team (JVET) of ITU-T SG 16 WP 3 and ISO/IEC JTC 1/SC 29/WG 11; Document: JVET-N0388-v3; 14th Meeting: Geneva, CH, Mar. 19-27, 2019, 5 pages.

Naser, Karam et al., "Non-CE6 Interaction between Implicit MTS and LFNST and MIP", Document: JVET-O0529, Joint Video Experts Team (JVET) of ITU-T SG 16 WP 3 and ISO/IEC JTC 1/SC 29/WG 11, 15th Meeting: Gothenburg, SE, Jul. 3-12, 2019, 6 pages.

Zhao, Xin et al., "Non-CE6: Harmonization of LFNST, MIP and implicit MTS", Document: JVET-O0540, Joint Video Experts Team (JVET) of ITU-T SG 16 WP 3 and ISO/IEC JTC 1/SC 29/WG 11, 15th Meeting: Gothenburg, SE, Jul. 3-12, 2019, 4 pages.

Anonymous, "Information Technology—Generic Coding of Moving Pictures and Associated Audio Information: Systems", International Organization for Standardization (ISO) and the International Electrotechnical Commission, (IEC), Document: ISO/IEC 13818-1, Fifth edition, Jul. 11, 2014, 131 pages.

Anonymous, "Information Technology—Generic Coding of Moving Pictures and Associated Audio Information: Video", International Organization for Standardization (ISO) and the International Electrotechnical Commission (IEC), International Standard 13818-2, Recommendation ITU-T H.262, Document: ISO 13818-2: 1995 (E), 1995, 255 pages.

ITU-T, "High Efficiency Video Coding", Recommendation ITU-T H.265, Series H: Audiovisual and Multimedia Systems, Infrastructure of Audiovisual Services—Coding of Moving Video, Apr. 2013, 317 pages.

Bross et al., "Versatile Video Coding (Draft 4)", JVET-M1001-V7, Editors, Joint Video Experts Team (JVET) of ITU-T SG 16 WP 3 and ISO/IEC JTC 1/SC 29/WG 11, 13th Meeting: Marrakech, MA, Jan. 9-18, 2019, 300 pages.

Waho, "Introduction to Information and Communication", 1st edition, Corona Publishing Co., Ltd., ISBN: 978-4-339-02857-7, Oct. 26, 2016, 14 pages.

\* cited by examiner

TRANSFORM SELECTION FOR IMPLICIT MULTIPLE TRANSFORM SELECTION

CROSS-REFERENCE TO RELATED APPLICATIONS

This application is a U.S. national stage application filed under 35 U.S.C. 371 of International Application No. PCT/US2020/034859, filed May 28, 2020, which is a non-provisional filing of, and claims priority to and the benefit of European Patent Application No. 19305698.3, filed May 31, 2019, and European Patent Application No. 19290045.4, filed Jun. 21, 2019, the entire contents of each of which are incorporated herein by reference as if fully set-forth herein in their respective entirety, for all purposes.

TECHNICAL FIELD

At least one of the present embodiments generally relates to a method or an apparatus for video encoding or decoding.

BACKGROUND

To achieve high compression efficiency, image and video coding schemes usually employ prediction, including spatial and/or motion vector prediction, and transforms to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction. A number of coding tools can be used in the process of coding and decoding, including transforms and inverse transforms.

SUMMARY

Drawbacks and disadvantages of the prior art may be addressed by the general aspects described herein, which are directed to block shape adaptive intra prediction directions in encoding and decoding.

According to a first aspect, there is provided a method. The method comprises steps setting syntax information indicative of use of a multiple transform selection mode when an implicit transform selection mode is used for encoding at least one video block in a bitstream; encoding said at least one video block using at least one transform corresponding to said syntax information; and, storing, conveying, or transmitting said bitstream comprising said encoded at least one video block According to a second aspect, there is provided a method. The method comprises steps parsing a bitstream for syntax information indicative of use of a multiple transform selection mode when an implicit transform selection mode is used for decoding video blocks; and, decoding at least one video block in said bitstream using at least one transform of a multiple transform selection mode corresponding to said syntax information when an implicit transform selection mode is used According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
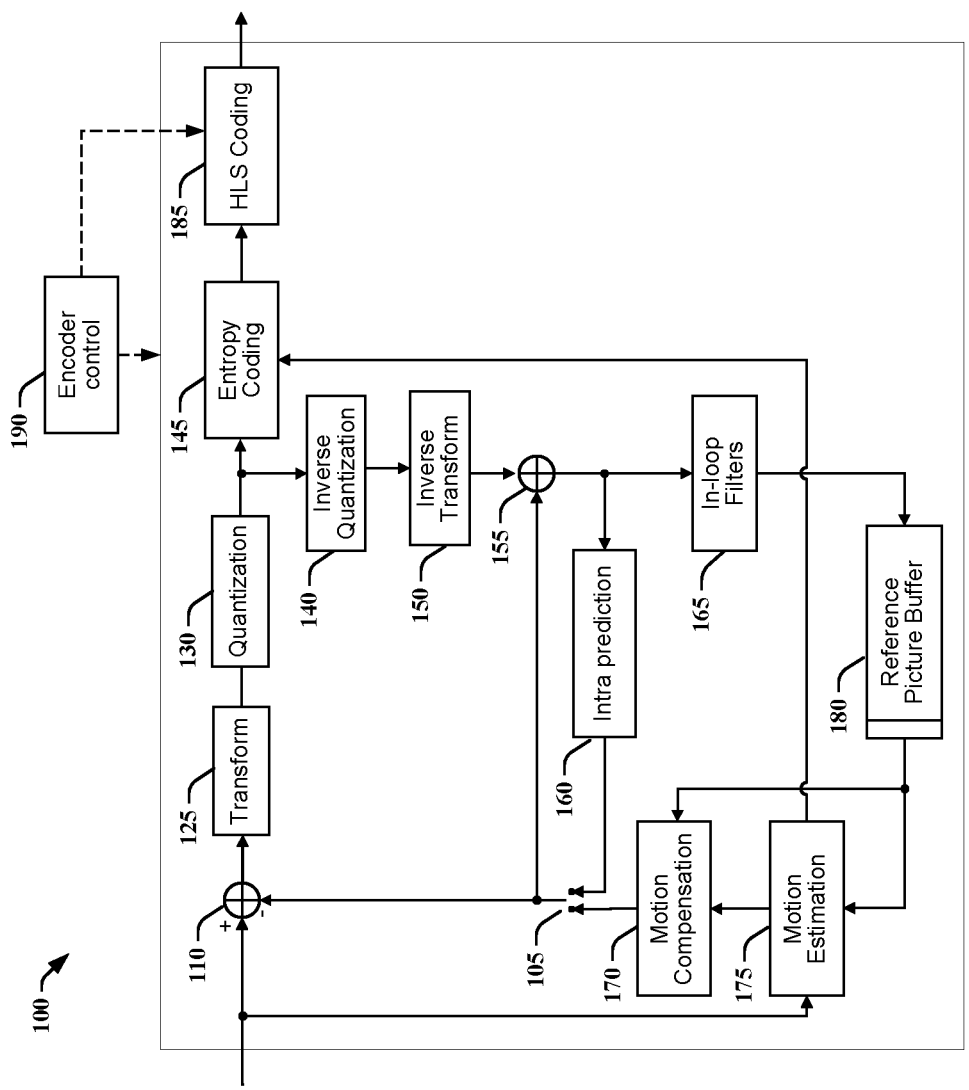
FIG. 1 shows a standard, generic video compression scheme

The following general aspects are in the field of video compression. They aim at improving compression efficiency of the upcoming video compression standard, Versatile Video Coding (VVC). Versatile Video coding (VVC) test model (VTM) is a standardization effort for improving video compression. Specifically, these aspects affect the transform design of this standard, where a compression deficiency is newly introduced because of adopting two tools, namely: Low-frequency Non-Separable Transform (LFNST) and Matrix-based intra prediction (MIP).

In addition to DCT2, VVC transform design comprises other transforms of DCT8 and DST7, where the whole is known as multiple transform selection (MTS). The coder can select one combination of the defined transforms: DCT2, DST7 and DCT8. The possible pairs of horizontal and vertical transforms are:
{DCT2, DCT2}
{DST7, DCT7}
{DST7, DCT8}
{DCT8, DST7}
{DCT8, DCT8}
MTS is controlled by an SPS (Sequence Parameter Set) flag that can deactivate it and only the pair of {DCT2, DCT2} is taken into consideration.

When the MTS flag is enabled, about 1.7% of coding gain is achieved over the MTS-off case, while large encoding time is needed because of the RDO (Rate Distortion Optimization) competition between multiple candidates, which is time consuming. Alternatively, another mode of transform signaling was recently adopted in VVC, named MTSImplicit. In this mode, the transform selection is predefined (implicit) depending on the dimension of the transform block. In the specification of VVC, the selection of the transform for luma blocks with MTSImplicit is as follows:
trTypeHor=(Width>=4 && Width<=16) ? DST7: DCT2
trTypeVer=(Height>=4 && Height<=16) ? DST7: DCT2

The same selection mechanism is used for intra-subpartitioning (ISP). This type of selection creates new pairs, which are the combinations between DCT2 and DST7. The following table summarizes the cases where they occur:

TABLE 1

| Width | Height | TrHor | TrVer |
|---|---|---|---|
| 2 | 8 | DCT2 | DST7 |
| 4 | 32 | DST7 | DCT2 |
| 4 | 64 | DST7 | DCT2 |
| 16 | 32 | DST7 | DCT2 |
| 16 | 64 | DST7 | DCT2 |
| 8 | 2 | DST7 | DCT2 |
| 32 | 4 | DCT2 | DST7 |
| 64 | 4 | DCT2 | DST7 |
| 32 | 16 | DCT2 | DST7 |
| 64 | 16 | DCT2 | DST7 |

Recently, two new coding tools were adopted to the JVET (Joint Video Experts Team) standard. The first is LFNST (Low Frequency Non-Separable Transform), formerly known as NSST (non-separable secondary transform). It is an efficient tool that considers the redundancy in the transform domain and applies "another" non-separable transform to yield a sparse representation of the residuals to be quantized and coded. In the version of the VVC Test Model VTM-5.0, two LFNST transform sets are defined. One transform set is for large residual blocks, and the other is for small residual blocks. For each set, four groups of transforms are defined, where each group contains two transform matrices. The selection of the group depends on the intra-prediction mode, and the transform index is coded in the bitstream.

Unlike the primary transforms, which are DCT2, DST7 and DCT8, LFSNT is a trained transform. In other words, the basis functions of LFNST are obtained by learning from some large dataset of residual data. The nature of the dataset and the method of training is not described in any public document.

The second tool is Matrix based Intra Prediction (MIP). It is also a trained tool to predict a block from its neighboring reference samples. It can be considered as an extension to the existing intra prediction, where the prediction signal is generated by multiplying the reference samples by a matrix rather than a simple copy along the prediction direction. Similar to LFNST, the matrices that are used for multiplication are trained ones, without description about the dataset that are used for obtaining them.

To understand the interaction of these tools with MTSImplicit transform design, the simulation was run using VTM-5.0 with a common testing condition. For brevity, the simulation results with one frame intra coding are presented. The anchor is VTM-5.0 with MTS disabled (--MTS=0) and the test is the implicit transform design (--MTS=0--MTSImplicit=1). The results are shown in the table below:

TABLE 2

| Class A1 | 0.56% | −0.14% | −0.46% |
|---|---|---|---|
| Class A2 | −0.13% | −1.30% | −0.87% |
| Class B | 0.34% | −0.52% | −0.63% |
| Class C | 0.47% | 0.81% | −1.21% |
| Class E | 0.42% | −0.28% | −0.90% |
| Overall | 0.34% | −0.25% | −0.82% |
| Class D | 0.61% | −0.79% | −0.12% |
| Class F | 0.26% | −0.36% | −0.03% |

As can be seen, there is a loss of 0.3% instead of an expected gain of implicit transform design. Another test is carried out to verify the coding gain when the two new tools are deactivated. Namely, the anchor and tests are the same but with LFNST and MIP set to zero. The results are provided in the table below:

TABLE 3

| Class A1 | −1.26% | −1.69% | −1.30% |
|---|---|---|---|
| Class A2 | −1.16% | −1.22% | −1.61% |
| Class B | −1.04% | −1.66% | −2.09% |
| Class C | −0.46% | −0.81% | −0.89% |
| Class E | −1.60% | −2.38% | −1.64% |
| Overall | −1.06% | −1.52% | −1.54% |
| Class D | −0.30% | −2.02% | 0.22% |
| Class F | −0.24% | −1.16% | −1.04% |

Therefore, it can be concluded that the expected gain is retained when the new tools are switched off.

To understand the impact of each of the tools, the two tools are deactivated individually. The table below presents the results of switching only LFNST to zero and keeping MIP activated:

TABLE 4

|  | Y | U | V |
|---|---|---|---|
| Class A1 | −1.01% | −1.27% | −1.75% |
| Class A2 | −1.02% | −1.49% | −1.35% |
| Class B | −0.88% | −1.32% | −1.50% |
| Class C | −0.58% | −0.95% | −0.21% |
| Class E | −1.30% | −1.67% | −2.21% |
| Overall | −0.93% | −1.32% | −1.35% |
| Class D | −0.13% | −0.86% | −0.68% |
| Class F | −0.26% | −1.39% | −1.34% |

And the table below is for the case of MIP is off and LFNST off:

TABLE 5

|          | Y      | U      | V      |
|----------|--------|--------|--------|
| Class A1 | 0.80%  | −0.36% | −0.67% |
| Class A2 | −0.15% | −1.37% | −0.70% |
| Class B  | 0.29%  | −0.64% | −1.57% |
| Class C  | 0.29%  | −0.62% | −0.29% |
| Class E  | 0.27%  | −0.23% | −0.64% |
| Overall  | 0.30%  | −0.64% | −0.83% |
| Class D  | 0.62%  | 0.47%  | 1.20%  |
| Class F  | 0.43%  | −0.89% | −0.11% |

From simulation results, it can be observed that MIP and/or LFNST are not compatible with the implicit transform design. However, the impact of LFNST is much more severe than MIP. The reason for incompatibility is that those tools are trained with residuals that do not have the new pairs of transforms specified in the MTSImplicit tool. Indeed, MTSImplicit comes with a loss in coding efficiency when used in combination with these two tools.

The general aspects described solve the problem of MTSImplicit loss and improving the transform design of ImplicitMTS by considering interaction with the tools LFNST and MIP. The MTSImplicit design does not fit well with the new added tools of LFNST and MIP. To solve this problem, the simplest way is to deactivate the implicit selection when these tools are activated.

Embodiment 1: Implicit MTS with DCT2 when LFNST and/or MIP are Activated

In VTM5, the selection of MTSImplicit transform is described as follows:
trTypeHor=(Width>=4 && Width<=16) ? DST7: DCT2
trTypeVer=(Height>=4 && Height<=16) ? DST7: DCT2

To solve the problem of interaction with LFNST and MIP, the SPS flag of MIP (sps_mip_flag) and/or of LFNST (lfnst_enabled_flag) needs to be checked:

```
if (lfnst_enabled_flag)
{
trTypeHor = DCT2
trTypeVer = DCT2
}
{
trTypeHor = ( Width >= 4 && Width <= 16 ) ?
DST7 : DCT2
trTypeVer = ( Height >= 4 && Height <= 16) ?
DST7 : DCT2
}
```

Figure 3:
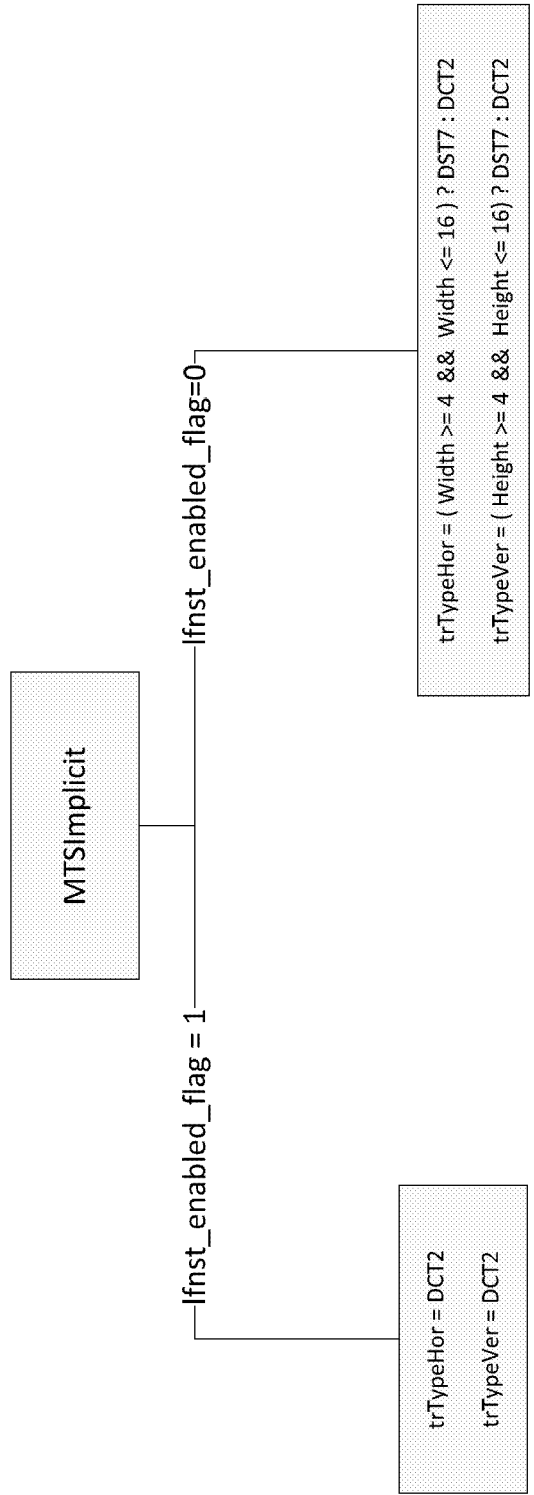
FIG. 3 shows an example flow diagram of a proposed method for selecting transform pairs depending on LFNST flag.

The corresponding flow chart is shown in FIG. 3.

To show the advantage of this method, the simulation was run with the same conditions as in the description of Table 2 (1-Frame analysis), with VTM5.0, the new method as test (both with the following options: --MTS=0 and --MTSImplicit=1), the following results are obtained:

TABLE 6

|          | Y      | U      | V      |
|----------|--------|--------|--------|
| Class A1 | −0.55% | 0.15%  | 0.47%  |
| Class A2 | 0.13%  | 1.32%  | 0.88%  |
| Class B  | −0.33% | 0.54%  | 0.64%  |
| Class C  | −0.46% | −0.79% | 1.22%  |

TABLE 6-continued

|          | Y      | U      | V      |
|----------|--------|--------|--------|
| Class E  | −0.41% | 0.29%  | 0.91%  |
| Overall  | −0.33% | 0.27%  | 0.83%  |
| Class D  | −0.61% | 0.80%  | 0.12%  |
| Class F  | −0.26% | 0.36%  | 0.04%  |

Additional conditions were also tested. Namely, if LFNST is deactivated, the following results are obtained:

TABLE 7

|          | Y      | U      | V      |
|----------|--------|--------|--------|
| Class A1 | −1.01% | −1.27% | −1.75% |
| Class A2 | −1.02% | −1.49% | −1.35% |
| Class B  | −0.88% | −1.32% | −1.50% |
| Class C  | −0.58% | −0.95% | −0.21% |
| Class E  | −1.30% | −1.67% | −2.21% |
| Overall  | −0.93% | −1.32% | −1.35% |
| Class D  | −0.13% | −0.86% | −0.68% |
| Class F  | −0.26% | −1.39% | −1.34% |

Finally, when MIP is disactivated, the following is obtained:

TABLE 8

|          | Y      | U      | V      |
|----------|--------|--------|--------|
| Class A1 | −0.79% | 0.36%  | 0.67%  |
| Class A2 | 0.15%  | 1.40%  | 0.71%  |
| Class B  | −0.28% | 0.64%  | 1.60%  |
| Class C  | −0.29% | 0.63%  | 0.29%  |
| Class E  | −0.27% | 0.24%  | 0.68%  |
| Overall  | −0.29% | 0.65%  | 0.85%  |
| Class D  | −0.62% | −0.46% | −1.17% |
| Class F  | −0.43% | 0.90%  | 0.11%  |

Another way to implement the method is to consider both LFNST flag and MIP flag:

```
if (lfnst_enabled_flag && sps_mip_flag)
{
trTypeHor = DCT2
trTypeVer = DCT2
}
{
trTypeHor = ( Width >= 4 && Width <= 16 ) ?
DST7 : DCT2
trTypeVer = ( Height >= 4 && Height <= 16) ?
DST7 : DCT2
}
```

Figure 4:
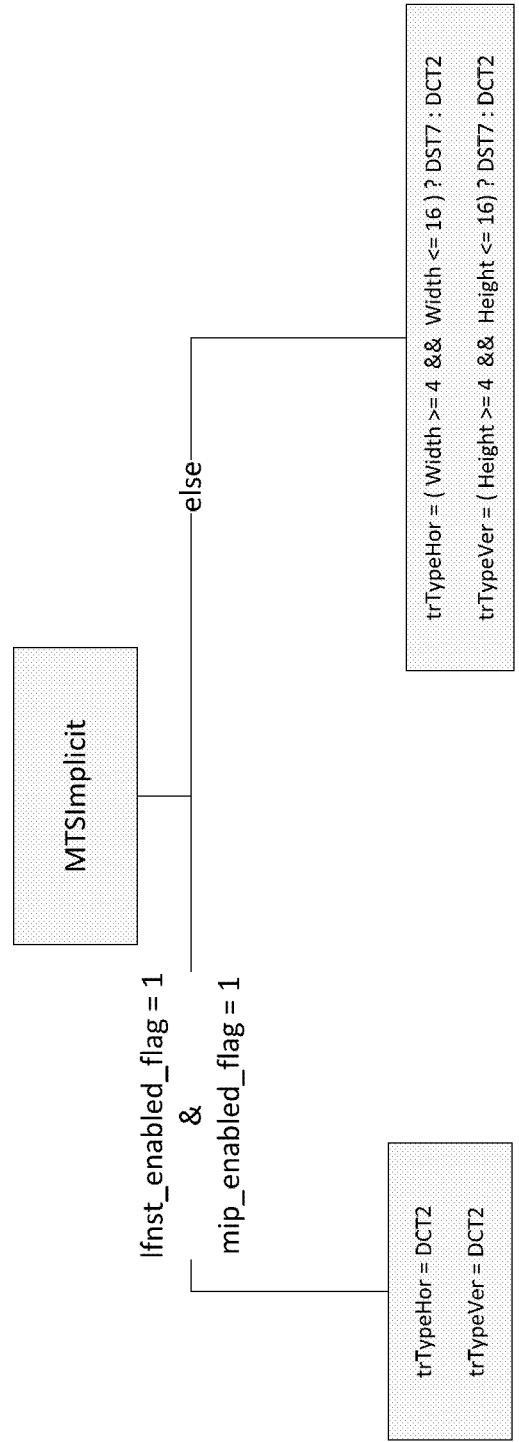
FIG. 4 shows an example flow diagram of a proposed method for selecting transform pairs depending on LFNST flag and MIP flag.

The corresponding flow chart is shown in FIG. 4.

In a variation of this embodiment, if LFNST OR MIP are activated for the current CU, the implicit MTS become DCT2, DCT2.

Embodiment 2: Implicit MTS with DCT2 when LFNST and/or MIP are Used

Other than checking the SPS flag, one can further look into the current coding unit (CU), and see if MIP or LFNST is used. For this case, implicit mts choice will be DCT2. In VTM5.0, lfnstIdx is the index of LFNST with values from 0 to 2. The zero indicates no LFNST. For MIP, the flag mipFlag indicates whether MIP is used. Therefore, the modification is:

```
if (CU:: lfnstIdx || cu:: mipFlag)
{
trTypeHor = DCT2
trTypeVer = DCT2
}
{
trTypeHor = ( Width >= 4 && Width <= 16 ) ?
DST7 : DCT2
trTypeVer = ( Height >= 4 && Height <= 16) ?
DST7 : DCT2
}
```

Figure 5:
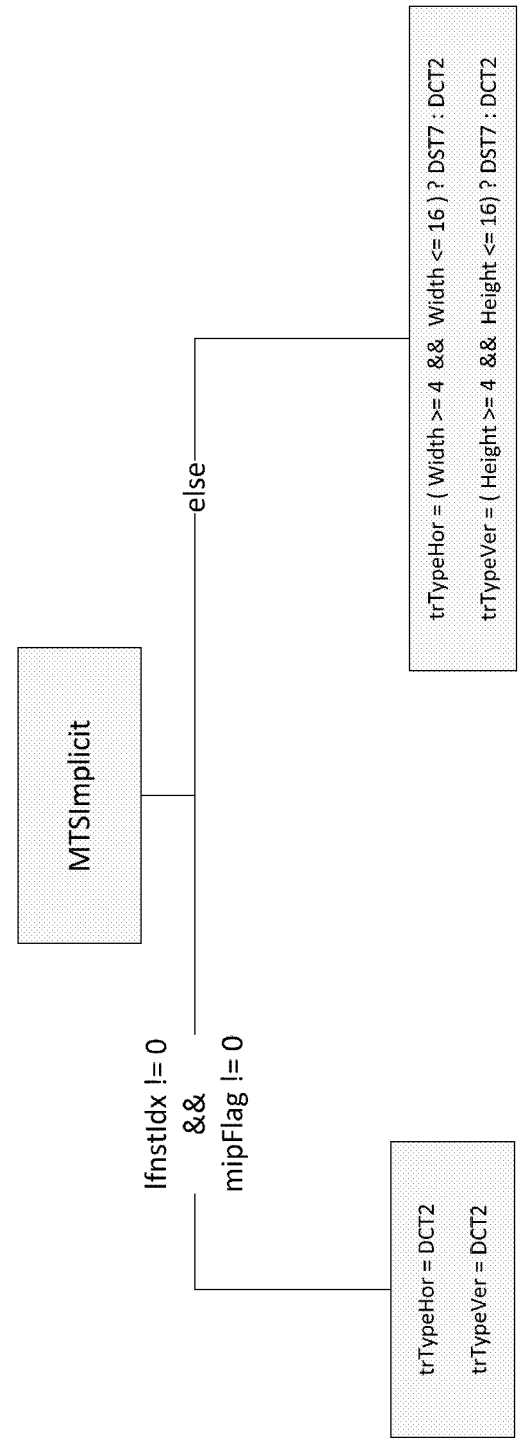
FIG. 5 shows an example flow diagram of a proposed method for selecting transform pairs depending on LFNST CU flag and MIP CU flag.

The corresponding flowchart is shown in FIG. 5.

The difficulty with this method is that the transform selection depends on the selected prediction mode. Generally, it is preferred not to have this dependency. However, since currently LFNST is intra-mode dependent, the method is acceptable.

Similarly, we can consider only the case when LFNST is used:

```
if (CU:: lfnstIdx)
{
trTypeHor = DCT2
trTypeVer = DCT2
}
{
trTypeHor = ( Width >= 4 && Width <= 16 ) ?
DST7 : DCT2
trTypeVer = ( Height >= 4 && Height <= 16) ?
DST7 : DCT2
}
```

Figure 6:
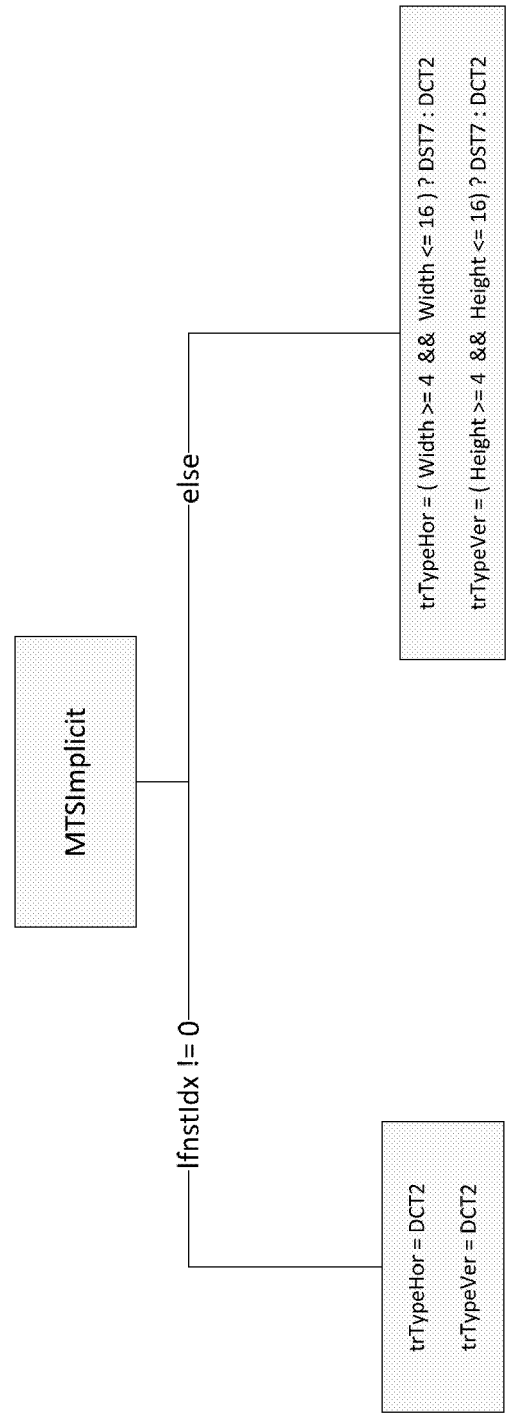
FIG. 6 shows an example flow diagram of a proposed method for selecting transform pairs depending on LFNST CU flag.

The corresponding flow chart is shown in FIG. 6.

In a variation of this embodiment, if LFNST OR MIP are activated for the current CU, the implicit MTS become DCT2, DCT2.

One frame analysis is also carried out here. The anchor is VTM5.0, the new method as test (both with the following options: --MTS=0 and --MTSImplicit=1), the following results are obtained:

TABLE 9

|          | Y      | U      | V      |
|----------|--------|--------|--------|
| Class A1 | −0.99% | −0.54% | −0.43% |
| Class A2 | −0.60% | 0.11%  | 0.11%  |
| Class B  | −0.77% | −0.35% | 0.23%  |
| Class C  | −0.60% | 0.30%  | −0.26% |
| Class E  | −0.81% | −0.57% | 0.44%  |
| Overall  | −0.75% | −0.20% | 0.03%  |
| Class D  | −0.65% | 0.01%  | 0.98%  |
| Class F  | −0.42% | 0.21%  | −0.24% |

To show the advantage over the method of Embodiment 1, the one frame analysis was run with Embodiment 1 as anchor, and the current method as test. The following results are obtained:

TABLE 10

|          | Y      | U      | V      |
|----------|--------|--------|--------|
| Class A1 | −0.43% | −0.67% | −0.89% |
| Class A2 | −0.73% | −1.19% | −0.76% |
| Class B  | −0.44% | −0.88% | −0.40% |
| Class C  | −0.14% | 1.13%  | −1.46% |
| Class E  | −0.40% | −0.85% | −0.50% |
| Overall  | −0.41% | −0.45% | −0.80% |

TABLE 10-continued

|          | Y      | U      | V      |
|----------|--------|--------|--------|
| Class D  | −0.04% | −0.79% | 0.83%  |
| Class F  | −0.16% | −0.16% | −0.28% |

Figure 7:
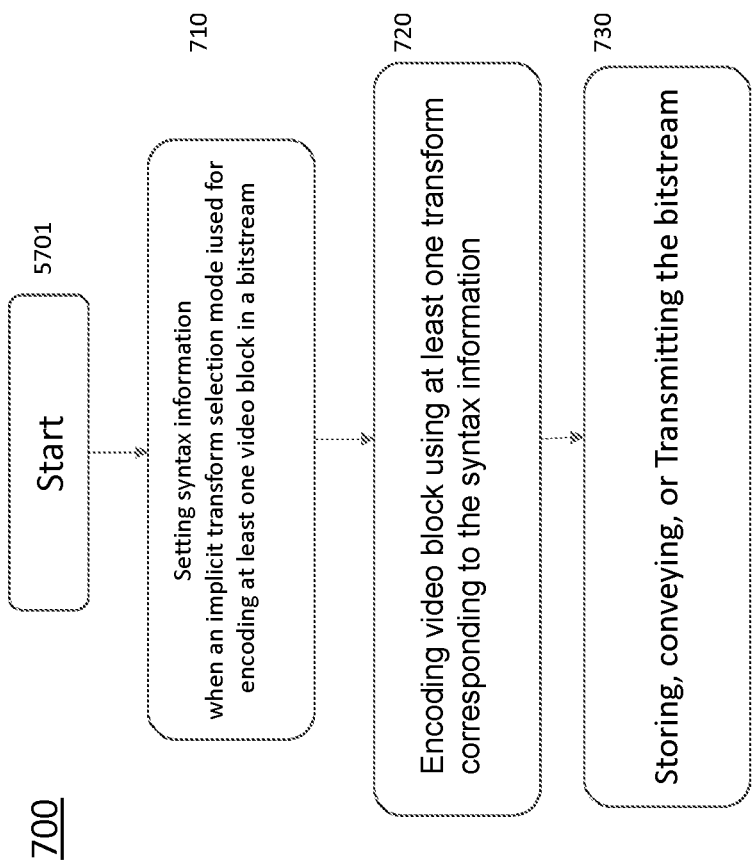
FIG. 7 shows one embodiment of an encoding method under the general aspects described.

One embodiment of a method 700 under the general aspects described here is shown in FIG. 7. The method commences at start block 701 and control proceeds to block 710 for setting syntax information indicative of use of a multiple transform selection mode when an implicit transform selection mode is used for encoding at least one video block in a bitstream. Control proceeds from block 710 to block 720 for encoding the at least one video block using at least one transform corresponding to the syntax information. Control proceeds from block 720 to block 730 for storing, conveying, or transmitting the bitstream comprising the encoded at least one video block.

Figure 8:
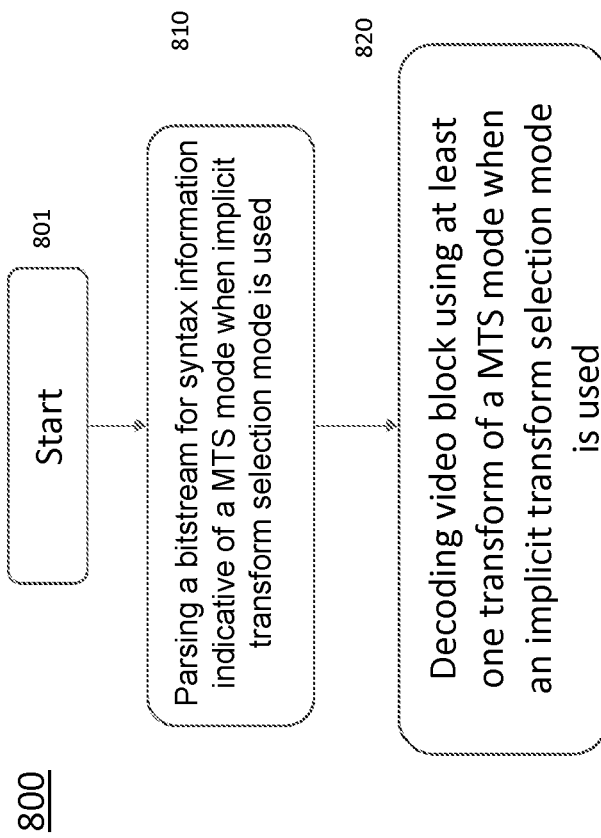
FIG. 8 shows one embodiment of a decoding method under the general aspects described.

One embodiment of a method 800 under the general aspects described here is shown in FIG. 8. The method commences at start block 801 and control proceeds to block 810 for parsing a bitstream for syntax information indicative of use of a multiple transform selection mode when an implicit transform selection mode is used for decoding video blocks. Control proceeds from block 810 to block 820 for decoding at least one video block in said bitstream using at least one transform of a multiple transform selection mode corresponding to said syntax information when an implicit transform selection mode is used.

Figure 9:
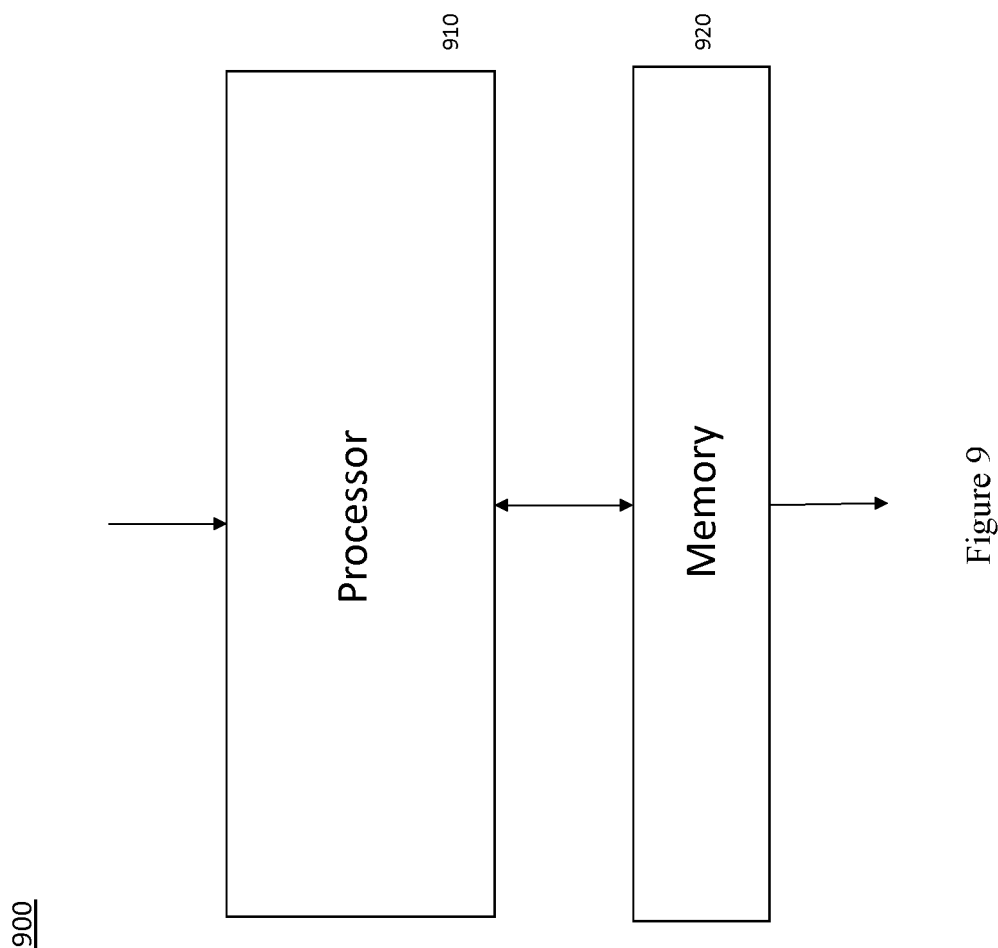
FIG. 9 shows one embodiment of an apparatus for encoding or decoding using intra prediction mode extensions.

FIG. 9 shows one embodiment of an apparatus 900 for compressing, encoding or decoding video using coding or decoding tools. The apparatus comprises Processor 910 and can be interconnected to a memory 920 through at least one port. Both Processor 910 and memory 920 can also have one or more additional interconnections to external connections.

Processor 910 is also configured to either insert or receive information in a bitstream and, either compressing, encoding or decoding using various coding tools.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 2:
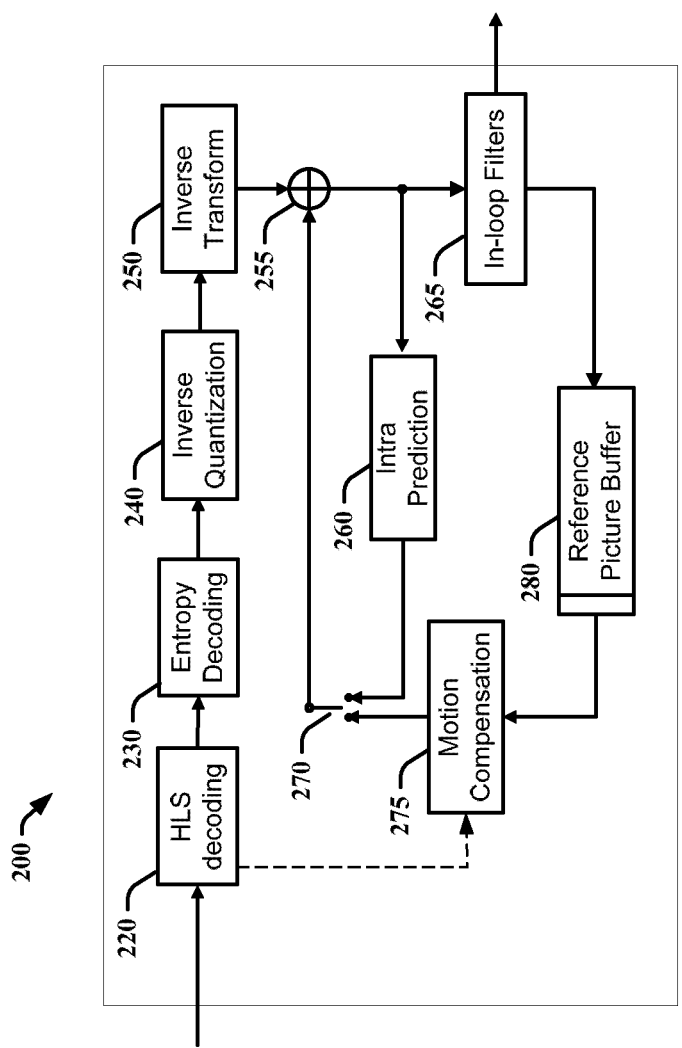
FIG. 2 shows a standard, generic, video compression scheme.
Figure 10:
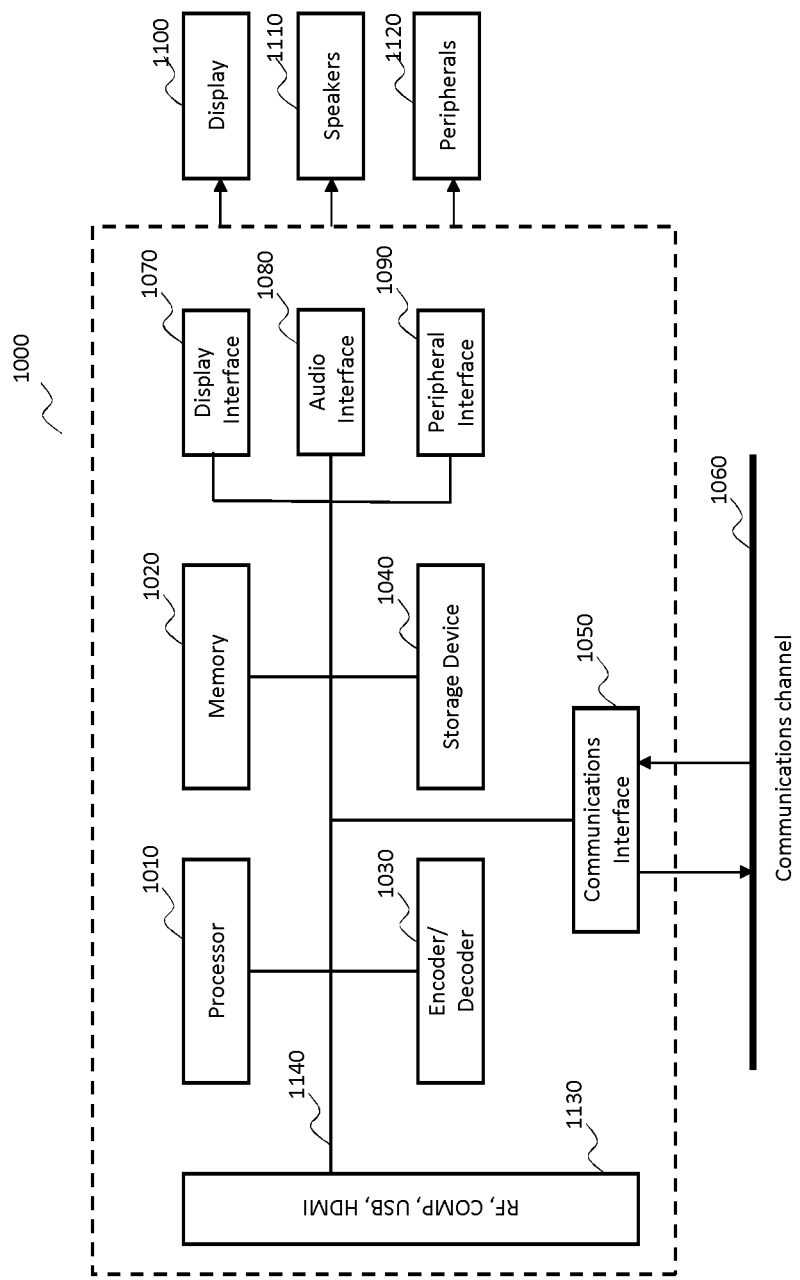
FIG. 10 shows a typical processor arrangement in which the described embodiments may be implemented.

The aspects described and contemplated in this application can be implemented in many different forms. FIGS. 1, 2, and 10 provide some embodiments, but other embodiments are contemplated and the discussion of FIGS. 1, 2, and 10 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 1 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 10 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor fora laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A process or device to encode or decode video data using low frequency non-separable transforms with multiple transform selection.

A process or device to encode or decode video data using low matrix-based intra-prediction with multiple transform selection.

A process or device to encode or decode video data using low frequency non-separable transforms with implicit multiple transform selection.

A process or device to encode or decode video data using low matrix-based intra-prediction with implicit multiple transform selection.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine coding mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
   parsing a bitstream for a first syntax element indicating whether a low frequency non-separable transform is used and a second syntax element indicating whether a matrix-based intra prediction is used;
   determining that the first syntax element indicates the low frequency non-separable transform is not used and that the second syntax element indicates the matrix-based intra prediction is not used;
   selecting at least one transform type based on a size of a transform block responsive to the determining; and
   decoding at least one video block based on the selected at least one transform type.

2. The method of claim 1, wherein selecting the at least one transform type based on the size of the transform block comprises, in a case where a width of the transform block is greater than 4 and lower than 16, selecting a horizontal discrete sine transform type 7, and selecting a horizontal discrete cosine transform type 2 otherwise.

3. The method of claim 1, wherein selecting the at least one transform type based on the size of the transform block comprises, in a case where a height of the transform block is greater than 4 and lower than 16, selecting a vertical discrete sine transform type 7, and selecting a vertical discrete cosine transform type 2 otherwise.

4. The method of claim 1, further comprising parsing the bitstream for syntax information indicative of use of an implicit multiple transform selection mode and wherein selecting the at least one transform type based on the size of the transform block comprises implicitly selecting the at least one transform type based on the size of the transform block.

5. An apparatus, comprising:
   one or more processors configured to implement:
   parsing a bitstream for a first syntax element indicating whether a low frequency non-separable transform is used and a second syntax element indicating whether a matrix-based intra prediction is used;
   selecting at least one transform type based on a size of a transform block responsive to determining, based on the first syntax element, that the low frequency non-separable transform is not used and, determining, based on the second syntax element, that the matrix-based intra prediction is not used; and
   decoding at least one video block based on the selected at least one transform type.

6. The apparatus of claim 5, wherein selecting the at least one transform type based on the size of the transform block comprises, in a case where a width of the transform block is greater than 4 and lower than 16, selecting a horizontal discrete sine transform type 7, and selecting a horizontal discrete cosine transform type 2 otherwise.

7. The apparatus of claim 5, wherein selecting the at least one transform type based on the size of the transform block comprises, in a case where a height of the transform block is greater than 4 and lower than 16, selecting a vertical discrete sine transform type 7, and selecting a vertical discrete cosine transform type 2 otherwise.

8. The apparatus of claim 5, wherein the one or more processors are further configured to implement parsing the bitstream for syntax information indicative of use of an implicit multiple transform selection mode and wherein selecting the at least one transform type based on the size of the transform block comprises implicitly selecting the at least one transform type based on the size of the transform block.

9. A method, comprising:
   encoding a first syntax element indicating whether a low frequency non-separable transform is used and a second syntax element indicating whether a matrix-based intra prediction is used;
   determining that the first syntax element indicates the low frequency non-separable transform is not used and that the second syntax element indicates the matrix-based intra prediction is not used;
   selecting at least one transform type based on a size of a transform block responsive to the determining; and
   encoding at least one video block based on the selected at least one transform type.

10. The method of claim 9, wherein selecting the at least one transform type based on the size of the transform block comprises, in a case where a width of the transform block is greater than 4 and lower than 16, selecting a horizontal discrete sine transform type 7, and selecting a horizontal discrete cosine transform type 2 otherwise.

11. The method of claim 9, wherein selecting the at least one transform type based on the size of the transform block comprises, in a case where a height of the transform block is greater than 4 and lower than 16, selecting a vertical discrete sine transform type 7, and selecting a vertical discrete cosine transform type 2 otherwise.

12. The method of claim 9, further comprising encoding syntax information indicative of use of an implicit multiple transform selection mode and wherein selecting the at least one transform type based on the size of the transform block comprises implicitly selecting the at least one transform type based on the size of the transform block.

13. An apparatus, comprising:
one or more processors configured to implement:
encoding a first syntax element indicating whether a low frequency non-separable transform is used and a second syntax element indicating whether a matrix-based intra prediction is used;
selecting at least one transform type based on a size of a transform block responsive to determining, based on the first syntax element that the low frequency non-separable transform is not used and, determining, based on the second syntax element, that the matrix-based intra prediction is not used; and
encoding at least one video block based on the selected at least one transform type.

14. The apparatus of claim 13, wherein selecting the at least one transform type based on the size of the transform block comprises, in a case where a width of the transform block is greater than 4 and lower than 16, selecting a horizontal discrete sine transform type 7, and selecting a horizontal discrete cosine transform type 2 otherwise.

15. The apparatus of claim 13, wherein selecting the at least one transform type based on the size of the transform block comprises, in a case where a height of the transform block is greater than 4 and lower than 16, selecting a vertical discrete sine transform type 7 and selecting a vertical discrete cosine transform type 2 otherwise.

16. The apparatus of claim 13, wherein the one or more processors are further configured to implement encoding syntax information indicative of use of an implicit multiple transform selection mode and wherein selecting the at least one transform type based on the size of the transform block comprises implicitly selecting the at least one transform type based on the size of the transform block.

\* \* \* \* \*